Oct. 26, 1965    L. L. HIGGINS    3,214,728
METHOD AND APPARATUS FOR DETECTING WAKES OF OBJECTS MOVING
IN A BODY OF WATER BY MEASURING DIFFERENCES IN THE
ELECTRICAL IMPEDANCE OF WATER AT
SPACED REGIONS THEREOF
Filed March 11, 1960    5 Sheets-Sheet 1
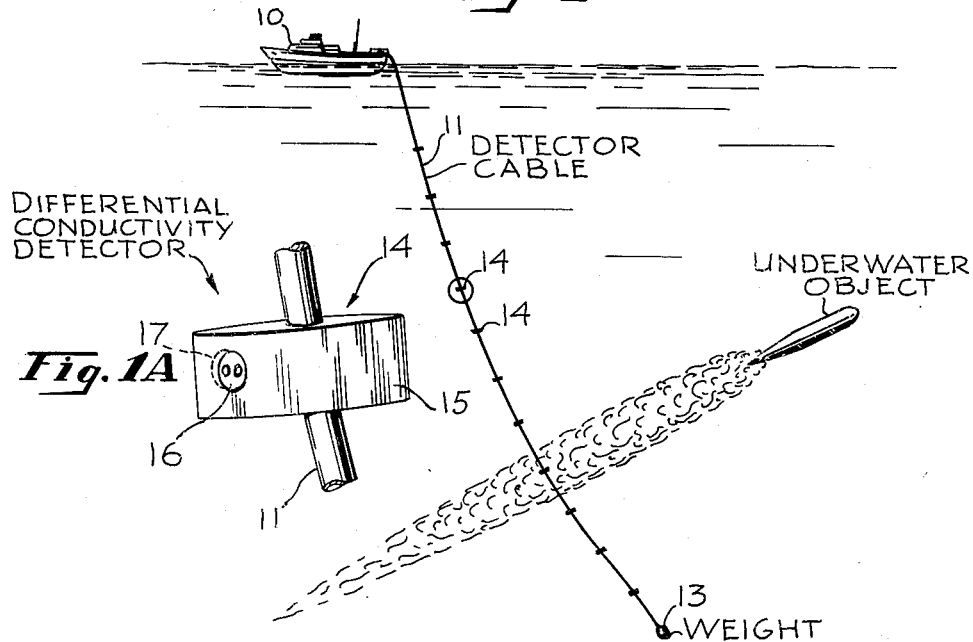
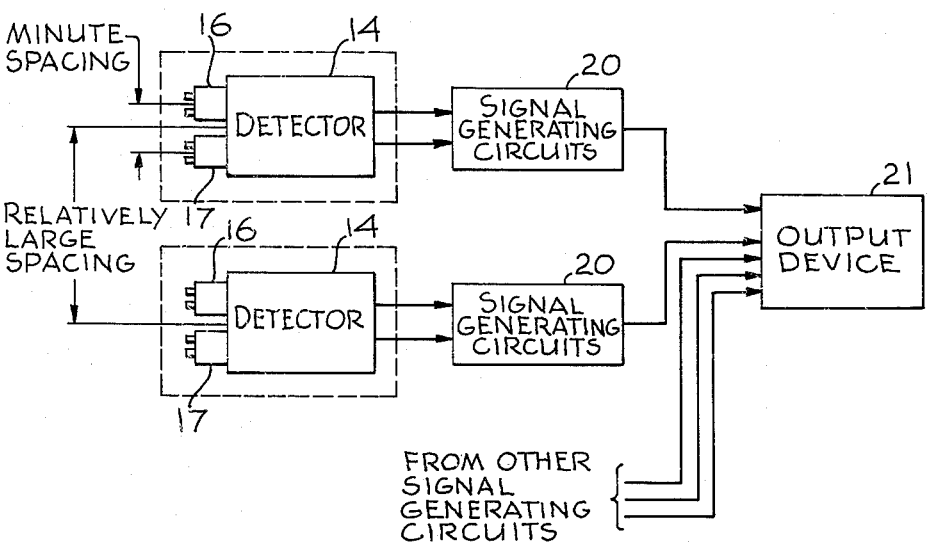
LARRY L. HIGGINS
INVENTOR.
BY MORRIS SPECTOR
FRASER & BOGUCKI
ATTORNEYS Oct. 26, 1965 L. L. HIGGINS 3,214,728
METHOD AND APPARATUS FOR DETECTING WAKES OF OBJECTS MOVING
IN A BODY OF WATER BY MEASURING DIFFERENCES IN THE
ELECTRICAL IMPEDANCE OF WATER AT
SPACED REGIONS THEREOF
Filed March 11, 1960 5 Sheets-Sheet 2
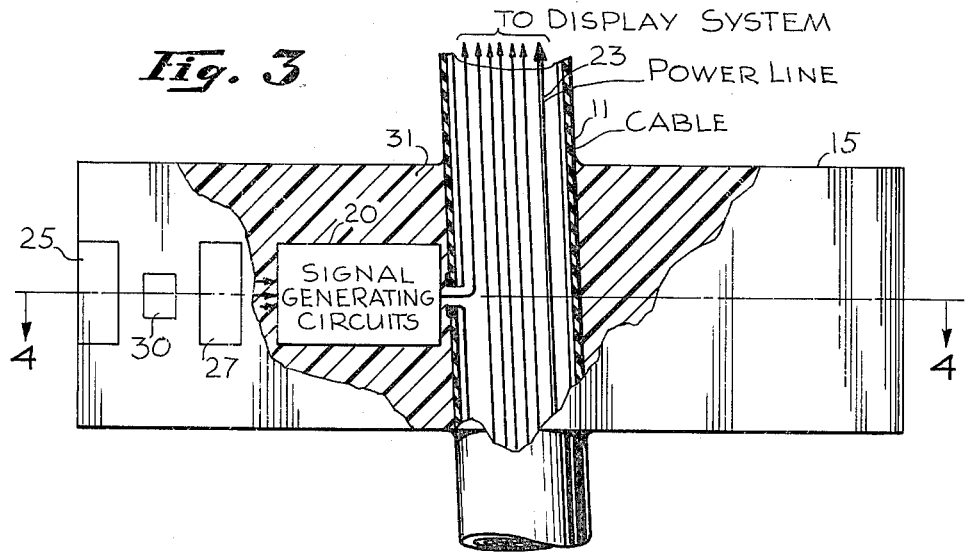
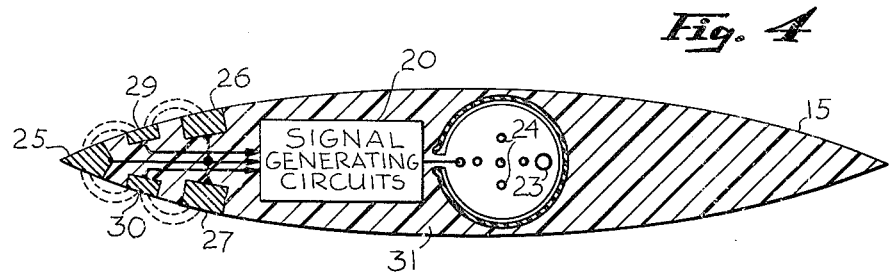
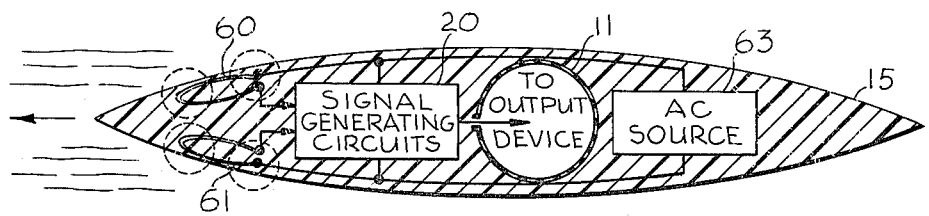
LARRY L. HIGGINS
INVENTOR.
BY MORRIS SPECTOR
FRASER & BOGUCKI
ATTORNEYS Oct. 26, 1965     L. L. HIGGINS     3,214,728
METHOD AND APPARATUS FOR DETECTING WAKES OF OBJECTS MOVING
IN A BODY OF WATER BY MEASURING DIFFERENCES IN THE
ELECTRICAL IMPEDANCE OF WATER AT
SPACED REGIONS THEREOF
Filed March 11, 1960     5 Sheets-Sheet 3
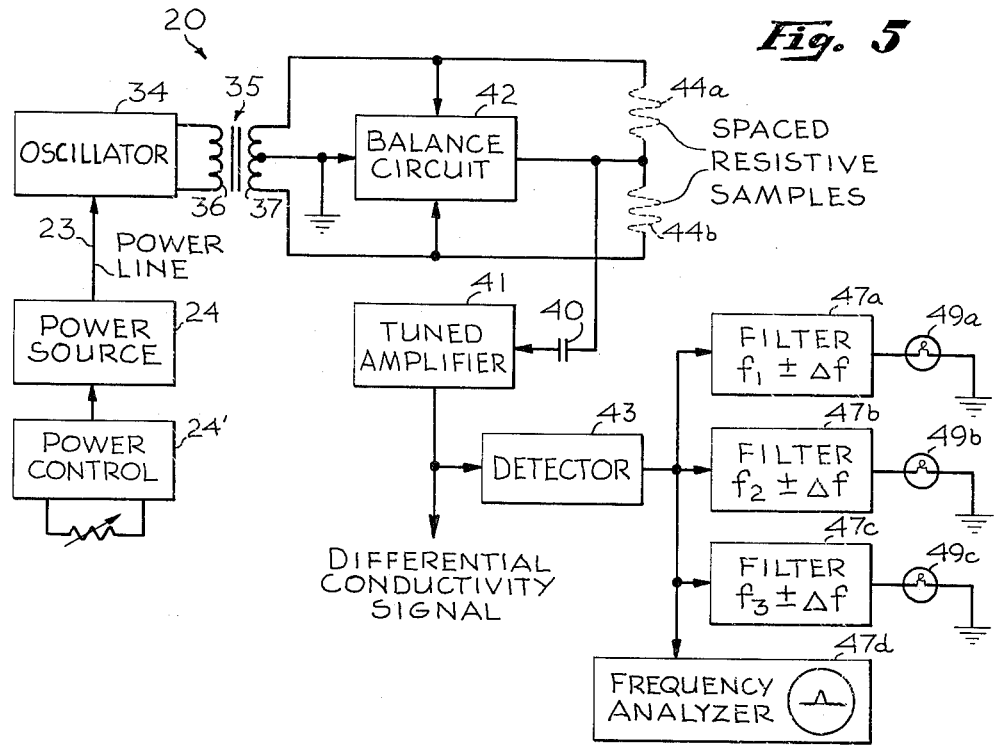
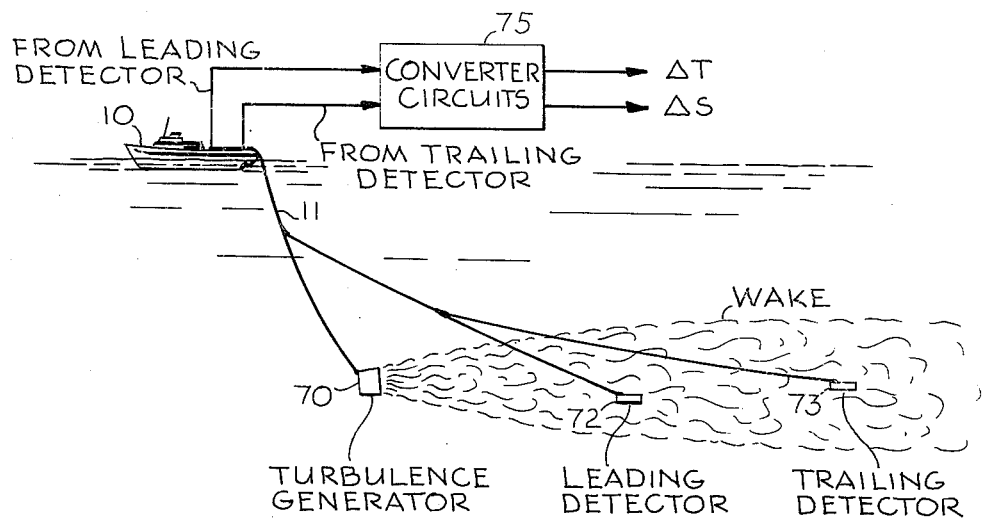
LARRY L. HIGGINS
INVENTOR.
BY MORRIS SPECTOR
FRASER & BOGUCKI
ATTORNEYS Oct. 26, 1965 L. L. HIGGINS 3,214,728
METHOD AND APPARATUS FOR DETECTING WAKES OF OBJECTS MOVING
IN A BODY OF WATER BY MEASURING DIFFERENCES IN THE
ELECTRICAL IMPEDANCE OF WATER AT
SPACED REGIONS THEREOF
Filed March 11, 1960 5 Sheets-Sheet 4
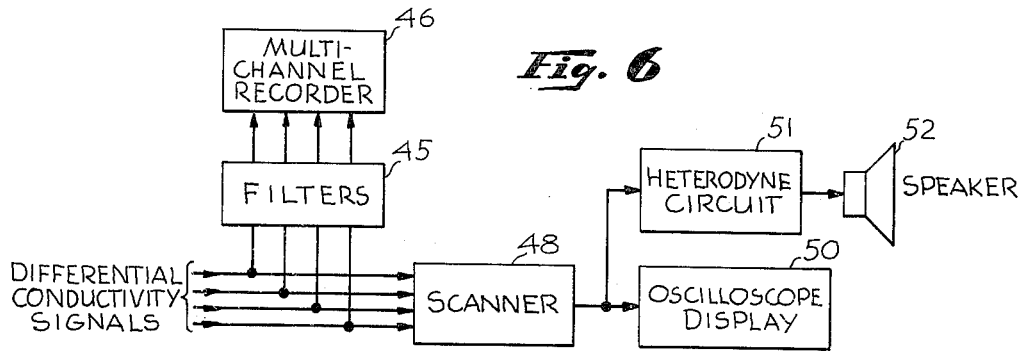
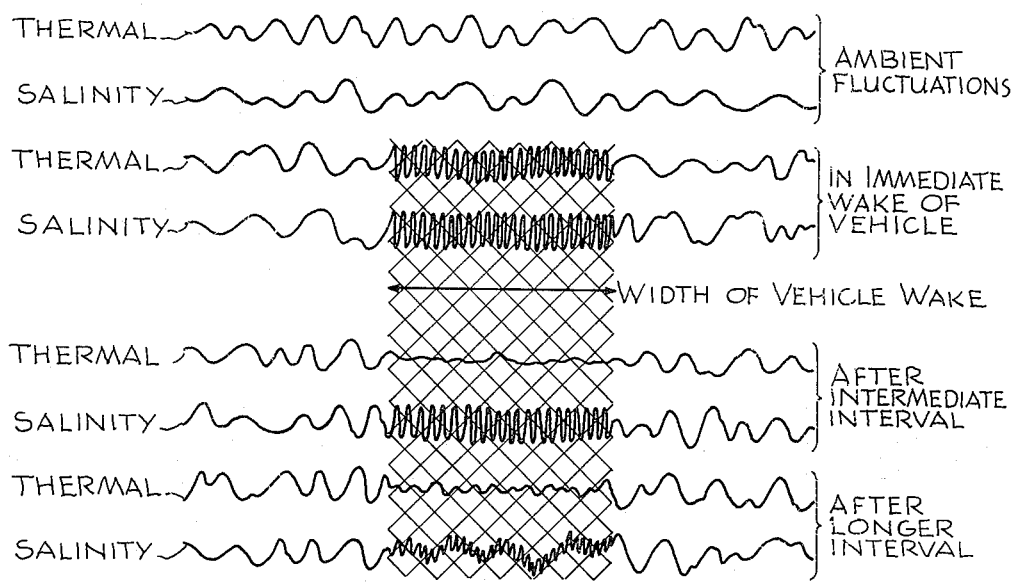
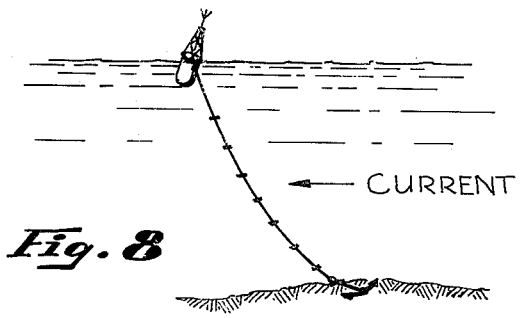
LARRY L. HIGGINS
INVENTOR.
BY MORRIS SPECTOR
FRASER & BOGUCKI
ATTORNEYS Oct. 26, 1965 L. L. HIGGINS 3,214,728
METHOD AND APPARATUS FOR DETECTING WAKES OF OBJECTS MOVING
IN A BODY OF WATER BY MEASURING DIFFERENCES IN THE
ELECTRICAL IMPEDANCE OF WATER AT
SPACED REGIONS THEREOF
Filed March 11, 1960 5 Sheets-Sheet 5
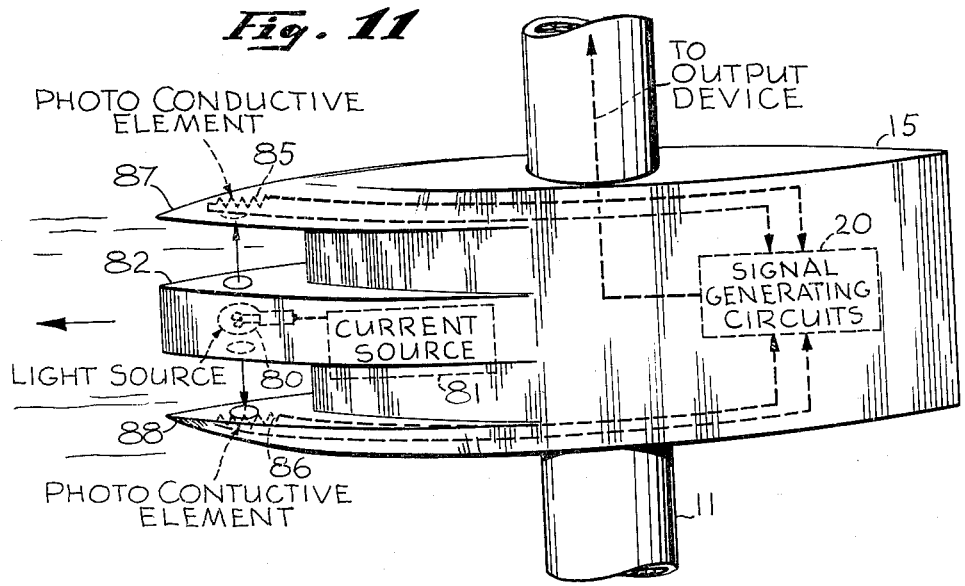
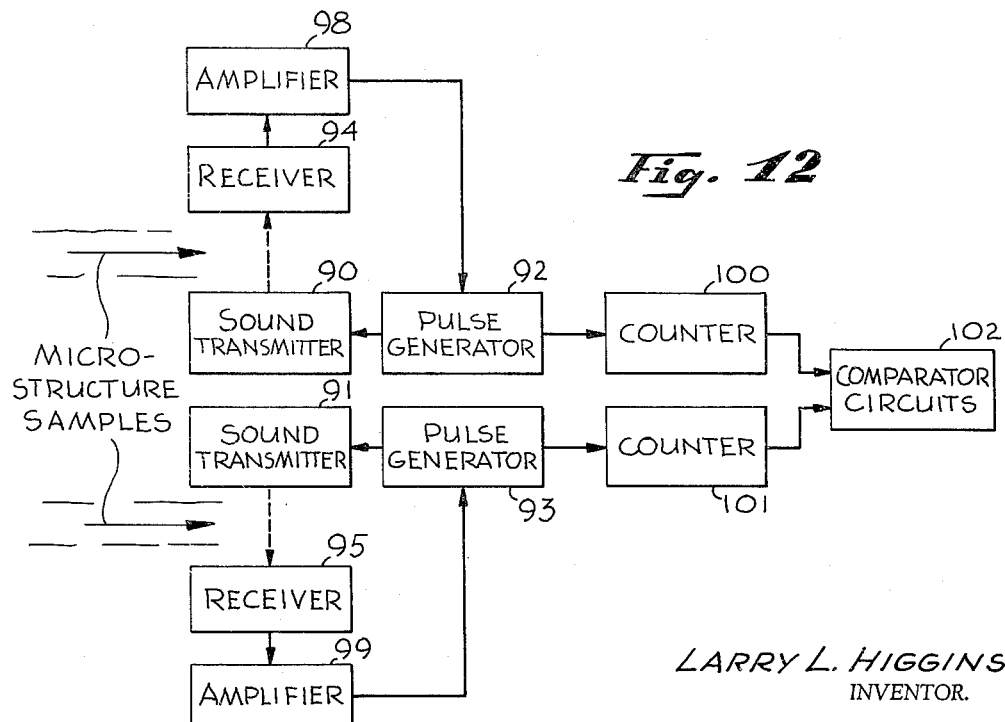
LARRY L. HIGGINS
INVENTOR.
BY MORRIS SPECTOR
FRASER & BOGUCKI
ATTORNEYS · # United States Patent Office 3,214,728
Patented Oct. 26, 1965

3,214,728
METHOD AND APPARATUS FOR DETECTING WAKES OF OBJECTS MOVING IN A BODY OF WATER BY MEASURING DIFFERENCES IN THE ELECTRICAL IMPEDANCE OF WATER AT SPACED REGIONS THEREOF
Larry L. Higgins, Woodland Hills, Calif., assignor to TRW Inc., a corporation of Ohio
Filed Mar. 11, 1960, Ser. No. 14,305
11 Claims. (Cl. 340—4)

This invention relates to methods and systems useful in the measurement and derivation of information from the physical properties of a liquid body, and more particularly to the new and improved methods and systems for the detection of underwater vehicles and objects.

The techniques which have heretofore been used for analyzing underwater states and activity have been both difficult to use and relatively imprecise. As a consequence, accurate oceanographic information can be obtained only by considerable expenditure in time and equipment. The present invention permits the ready derivation of precise information and is particularly suited to underwater detection problems.

Existing underwater detection techniques suffer from a number of different disadvantages. These disadvantages can be overcome, or compensated for, only through the use of a great deal of equipment and effort. For example, sonar devices and techniques have limited capabilities. In addition, direct signals from sonar devices are readily detectable at a far greater range than the range at which the sonar echoes are usefully discernible, so that counter measures may often be effectively employed. The underwater transmission of sonar impulses is also markedly affected by ocean layers, so that the effectiveness of sonar devices is sharply diminished at certain intermediate depths.

Limitations on range of operation are much greater if it is attempted to operate underwater detection systems at higher frequencies with electromagnetic waves. Just as submarines cannot be seen visually at appreciable depths except under the best of conditions, so electromagnetic waves are quickly dispersed and attenuated, and thus are virtually useless at even moderate distances. In order to have long range and high volume coverage with sonar or higher frequency devices using reflected waves, therefore, it is necessary that the vehicle carrying the device operate at very high speed and employ special complex equipment.

Present detection techniques are most effective when the underwater object is close to the surface, or actually on the surface. When close to the surface, the object being tracked may be more readily detected by sonar, and when on the surface it may be seen visually or may be detected by surface or airborne radar of very great range. It is extremely desirable, therefore, to provide underwater detection systems which have long range capabilities, and which particularly have capabilities which are complementary to the devices which are presently used. A system which can operate most effectively at great depths and in ocean layers can be teamed with sonar and radar to provide an extremely effective overall network for the detection and location of underwater objects.

"Listening" and other passive detection systems are also used, but, in general, these suffer from two primary disadvantages. In order to "listen" most effectively, such systems must be stationary, which means that they have to be substantially inoperative while their supporting vehicle is moving to a new location. The range and directivity of these passive systems are also adversely affected by variations in underwater conditions.

The difficulties encountered in operating underwater detection systems are merely illustrative of the difficulties involved in the broader problem of deriving information about the physical properties of the ocean. The present invention provides improved methods and systems for deriving such information.

At appreciable depths, ocean water has a number of physical properties which fluctuate only very gradually. At a given depth well below the surface, the water is sufficiently stabilized and well mixed for each minute volume of water to assume substantially the same state as the minute volumes by which it is bounded. Although there may be temperature inversion layers in the water, the changes do not occur abruptly or radically, as within a few centimeters or less, for example. Similarly, the salinity distribution within minute volumes at appreciable depths fluctuates only in a continuous non-abrupt fashion when considering like orders of dimension. These ambient fluctuations in physical properties tend to become more stable as depth increases.

A device which could detect changes from ambient fluctuations for particular variables, and which could determine the characteristics of the ambient fluctuations themselves, would provide valuable information about the nature of what might be called the oceanic microstructure. With devices of sufficient sensitivity, systems which can detect the movement of objects within the water are feasible. It will be recognized that such devices also are of general application for oceanographic purposes, and enable analysis of the characteristics of underwater samples from their ambient fluctuations alone. With such information, strata may be defined, currents may be identified and traced, and underwater conditions may be observed.

In accordance with one aspect of the present invention, an improved underwater detection system may be provided by employing a number of detector devices which are widely separated relative to each other and which move relative to the water. The detectors are spaced so that each travels through a narrow zone in a different underwater region. Each detector operates with high sensitivity to measure differences in selected physical properties between two separated but closely adjacent water samples within the region in which it moves. These differences are used to identify regions in which the ambient fluctuations of selected properties of the water have some time previously been disturbed by the turbulence of a moving vehicle or object to result in relatively abrupt fluctuations.

Systems and methods for underwater detection in accordance with the invention may, in a specific illustrative arrangement, utilize a support line which is anchored at one end in a vehicle, such as a surface craft, and which is maintained at an angle to the direction of movement of the vehicle by a weight at the free end of the support line. In a preferred form, a number of individual differential conductivity detectors may be mounted along the support line at relatively widely separated depths. Each of the conductivity detectors may include a balanced electrical bridge arrangement, in which two adjacent arms of the bridge are provided by conductivity samples introduced by two relatively narrow and closely adjacent zones of sea water which are associated with the detector. The ambient conductivity fluctuations at the various depths at which the detectors are maintained are dependent upon many variables, including temperature and salinity. When a detector passes through a region whose recent history is such that only natural forces have acted to affect the physical properties of the water, the conductivity differential between the two zones sensed by the detector is small, so the detector provides a low amplitude signal which changes relatively slowly with time. Where the microstructure of the physical state of the water has been materially altered by turbulence, as by the wake of a submarine, the differences in conductivity of the two microstructure samples fluctuate relatively abruptly. Thus, the differential conductivity detector provides a corresponding output signal of higher amplitude and more abrupt changes with time. In this manner the detectors cut across and identify, by appropriate signals, the wakes of submarines or other moving submersible objects which may have passed at some previous time.

In accordance with another aspect of the present invention, the differential conductivity detector may include spaced-apart electrode pairs which are exposed to the liquid samples under investigation. Alternatively, physical property differentials may be established by transformer-type elements which are not exposed but which generate magnetic fields which partially extend through the different samples under investigation.

Further, in accordance with the present invention, systems are provided by which the gradients of separate variables which affect conductivity may be individually established. At least two differential conductivity readings may be taken, one in the proximate wake of an object creating artificial turbulence, and another at a more distantly spaced point in the wake. Because fluctuations in different variables (such as temperature and salinity) die away at different rates, a comparison of the two readings permits establishment of the extent of fluctuation which is attributable to each of the variable factors. Precise characterization of liquid samples thus becomes feasible.

In accordance with still other aspects of this invention, the nature of the ocean microstructure may be analyzed through the use of various other physical properties. Thus, in one form, readings may be taken of light transmissivity differentials between two samples. In another form the detectors which are used may sense sound velocity fluctuations.

The novel features of the invention may be better understood by reference to the following description, taken in conjunction with the accompanying drawings, in which like reference numerals refer to like parts, and in which:

FIGURE 1 is a pictorial representation of the general arrangement of a system in accordance with the invention, including an enlarged representation of a differential detector used therein;

FIGURE 1A is an enlarged, perspective view of a detector such as may be employed in the arrangement of FIGURE 1.

FIGURE 2 is a schematic block diagram of the principal elements of a system including differential conductivity detectors, signal generating circuits, and an output device;

FIGURE 3 is a side view, partially broken away, of a fragment of the system of FIGURE 1, showing a preferred form of differential conductivity detector in detail;

FIGURE 4 is a plan view, in section, of the arrangement of FIGURE 3, taken along the line 4—4 of FIGURE 3 and looking in the direction of the designated arrows;

FIGURE 5 is a combined block diagram and schematic representation of signal generating circuits which may be employed for the like designated units of FIGURE 2;

FIGURE 6 is a block diagram representation of the principal elements of a system which may be used as the output device of FIGURE 2;

FIGURE 7 is a diagrammatic representation of amplitude variations with time of certain signals which are useful in describing the operation of systems in accordance with the present invention;

FIGURE 8 is a pictorial representation of a different arrangement of a system in accordance with the invention;

FIGURE 9 is a simplified schematic representation of a different form of differential conductivity detector which may be employed in accordance with the invention;

FIGURE 10 is a block diagram of the elements of a system for analyzing fluctuations in individual variables which contribute to conductivity fluctuations;

FIGURE 11 is a simplified representation of another form of detector which may be used in systems in accordance with the invention; and FIGURE 12 is a simplified representation of yet another form of detector which may be used in systems in accordance with the invention.

In accordance with the present invention, a given ocean-going vehicle 10 (referring now to FIGURE 1) may acquire added underwater detection capabilities through the use of a number of spaced submerged detectors. Although a surface vessel is shown as the vehicle 10, it will be recognized that the vehicle may as well be a helicopter, lighter-than-air craft, submarine, torpedo, or the like. A lengthy support cable 11 attached at one end to the vehicle 10 is trailed in the water, but is kept extended relative to the vehicle 10 through the use of a lead weight 13 at the free end of the cable 11. Thus the cable 11 extends down at an appreciable angle to the plane of movement of the vehicle 10, rather than trailing behind the vehicle 11, and may be let out to any depth desired. It may be desired to detect objects down to a maximum expected depth, say 1500 feet, so that the length of cable 11 should be sufficient when considering the angle maintained in the cable 11 by the weight 13 to reach depths of this order. It will be recognized that the drawings are necessarily not to scale.

A number of detectors for sensing differences in the physical properties of closely adjacent liquid samples are positioned at selected spaced points along the length of the cable 11 (these detectors 14 being better seen in the enlarged fragmentary representation). Each detector 14 includes a streamlined housing 15 mounted about the cable 11 and shaped so as to reduce the drag on the vehicle 10, and each includes a pair of detecting elements 16 and 17 which are spaced apart a finite but relatively minute distance (such as a centimeter) when compared to the spacing (such as approximately 100 feet) between adjacent differential detectors 14 along the cable 11.

In accordance with the present invention, the two detecting elements 16, 17 sense differences in physical properties between adjacent, closely spaced, narrow zones of the ocean microstructure. The physical properties which are sensed are all those properties which affect conductivity, including, for example, both temperature and salinity fluctuations. While conductivity is by itself properly considered to be an electrical property of a substance, the physical conditions which determine conductivity are the ultimate factors which are analyzed. In addition to temperature and salinity, these factors include air bubbles, oil globules, impurity nuclei, minute sea life, velocity fluctuations, and others. Because moving underwater objects physically upset the distribution of minute water volumes in the regions through which they pass, the discussion may properly be in terms of physical properties, even though electrical measurements of impedance or attenuation may be made. The term "physical properties" is thus intended to connote and include a broad variety of phenomena which fall within the realm of physics. It will become apparent, however, that certain preferred embodiments of the present invention advantageously rely upon measurement or detection of certain properties of a liquid medium such as sea water, to the relative exclusion of other properties. The properties which are selectively detected in specific embodiments are chosen in accordance with the particular operating environment and foreknowledge of the general nature of the disturbances produced by the class of objects it is sought to detect.

It is further a novel feature of the invention that means are provided for discriminating against certain classes or types of variations in the magnitude of a selected physical property of the liquid medium while employing highly sensitive means for detecting other classes or types of variations in the magnitude of this selected property.

By ocean "microstructure" is meant minute (such as fractions of a centimeter to centimeters), but not microscopic, dimensions.

The principal functional units in the arrangement of FIGURE 1 are shown in the block diagram of FIGURE 2. Each of the differential conductivity detectors 14, including a pair of detecting elements 16, 17, is coupled to signal generating circuits 20, the output terminals of which are coupled to an output device 21. The signal generating circuits 20 may be mounted in the support cable 11, or in the supporting vehicle 10 along with the output device 21. Each of the differential conductivity detectors 14 is physically associated with a different liquid sample presented by the narrow zone through which it moves. The detecting elements 16 and 17 need not be in any particular attitude relative to the vertical. One can also be above the other, or they can be diagonally separated. By comparison with the spacing between the closely adjacent zones being sampled, however, the regions through which the different detectors 14 pass are relatively widely separated.

Fundamentally, an underwater detection system in accordance with the present invention operates because the ambient fluctuations in the selected physical properties of the ocean microstructure remain disturbed for relatively long intervals by artificially (machine or animal) created turbulence. Minute volumes or globules of water at such depths which have not been disturbed are stabilized by natural diffusion processes. The same is true of the bubbles, impurity nuclei, and other minute elements within the water. The globules have substantially the same physical properties as the globules of water with which they are in contact. Thus ambient microstructural fluctuations have a relatively smoothly varying characteristic, and vary slowly over relatively long distances. When artificially disturbed, however, the ambient distribution of the globules and the particles within them is upset, and the fluctuations in the microstructure vary much more abruptly within a given distance which encompasses a number of microstructure samples.

In a preferred form, referring now to FIGURES 3 and 4, systems in accordance with the invention employ a highly effective differential conductivity detector 14 of streamlined configuration. The detector 14 has a streamlined housing 15 which is fixed to and in part encompasses a section of the support cable 11 at a point at which electrical couplings may be made through suitable apertures in the cable 11. Split sections, or other means for readily assembling the housing 15 on the cable 11, may be used in accordance with conventional techniques and are not shown or described in detail. The support cable 11 may be of conventional design for underwater applications, with an outer multiple-ply jacket and an internal dielectric in which a power line 23 and signal lines 24 from the various differential detectors are imbedded. The housing 15 of the detector 14 is shown to be principally of dielectric material, but it will be understood that, except for certain segments of the detector 14, the greater part of the detector 14 may be of metal, or of a combined metal and dielectric construction.

The principal operative units of the detector 14 are included in the streamlined housing 15, which is preferably so shaped and disposed that it tapers both forwardly and rearwardly along the direction of movement of the cable 11. The detecting elements 16 and 17 of FIGURE 2 are here defined by separate exposed, but imbedded, electrodes which are faired into the forward part of the streamlined housing 15. An electrode segment 25 in the leading edge of the detector is spaced apart from each of two separate but like center electrodes 26, 27 which are each disposed on a different side of the housing 15. Other, centrally disposed electrodes 29 and 30 are positioned between the leading edge electrode 25 and each of the center electrodes 26, 27. The center electrodes 29, 30 are separated by the dielectric material 31 within the housing 15 from the remaining electrodes 25, 26, and 27. The various electrodes 25, 26, 27, 29, and 30 are disposed well forward along the housing 15 so that turbulences and flow distortions introduced by the housing 15 itself are kept to a minimum.

The electrodes 25, 26, 27, 29, and 30 are preferably of a highly conductive material, such as platinum or stainless steel, which is not affected by the corrosive action of sea water. When an electrical potential exists between a center electrode 29 or 30 and the associated paired electrodes 25, 26, or 25, 27, the surrounding sea water provides a conductive path between the electrodes. The paired electrodes on each side accordingly form horizontally separated conductivity sensing elements which are associated with different resistive (sea water) samples. The disposition and configuration which are used have important operative advantages, because they permit readings to be secured from closely adjacent but separate zones without introducing turbulence which might cause errors to arise.

The conductivity variations between the upper and lower paired electrodes are applied to signal generating circuits 20 which may also be contained in the housing 15. It will be recognized, however, that all or part of the signal generating circuits 20 may be mounted in the associated vehicle 10 (FIGURE 1) where operating conditions permit or require. In the present instance the signal strengths and differential characteristics are so minute that it is preferred to employ amplifier circuits in the vicinity of the detector 14 so as to avoid possible inaccuracies due to the pick-up of extraneous signals or transients along the cable.

A preferred arrangement of the signal generating circuits 20 of FIGURE 3 is illustrated in FIGURE 5, all the elements being shown as located together, for convenience. Voltage from the power line 23 (FIGURE 3) may be applied to an oscillator 34 which excites the primary 36 of a transformer 35 with an alternating current signal of a selected frequency. The power line 23 is fed from a power source 24. The amount of power applied to the oscillator 34 is made controllable by power control means 24'. The secondary 37 of the transformer 35 may be center-tapped, with the center tap being coupled to ground. The opposite ends of the secondary 37 thus form the junction points of a bridge arrangement having as its two remaining arms the resistive samples provided by the sea water which electrically couples the different paired electrodes of the detector (FIGURE 3). Referring briefly to FIGURE 3, as well as FIGURE 5, it may be seen that the leading edge electrode 25 and the like spaced electrodes 26, 27 define the intermediate junction point for the spaced resistive samples, while the center electrodes 29 and 30 define the ends of the resistive samples which are directly connected to the opposite ends of the secondary 37. With the center tap of the secondary 37 grounded, output signals from the alternating current (hereafter A.C.) bridge circuit thus formed are provided through a coupling capacitor 40 and a tuned amplifier 41 as the differential conductivity signal which is desired for system operation.

The A.C. bridge circuit should have a high degree of sensitivity, and should be well balanced so as to eliminate excess noise and respond only to the variations between the spaced resistive samples themselves. A number of factors may act to disturb the balance. Sea water does not act as a pure resistance, having a small capacitive variation. This capacitive variation, however, is very much smaller than the resistance variations and may in fact provide useful information. More significant effects are introduced by stray capacitances and resistances in the circuit, which may have to be independently adjusted to achieve the desired balance. Rather than make these independent adjustments, however, it is preferred to make use of a balance circuit 42 coupled between the ends of the secondary 37 and the spaced resistive samples. Through the use of a balance circuit 42, as described in the book by Bernard Hague entitled "A.C. Bridge Methods," published by Pitman and Sons, Ltd., London (5th ed., revised 1957) and shown on p. 77 thereof, for example, the adjustment problem is considerably simplified. The A.C. carrier then averages to a substantially zero value, and the input signal is balanced down to a small value. Typically, the input signal may be reduced to $10^{-3}$ of its original value. Under these conditions, detection of the low frequency modulation of the carrier is facilitated.

For purposes that will hereinafter become more apparent, in accordance with the present invention, the output of the tuned amplifier 41 in FIGURE 5 may be advantageously applied to an envelope detector 43. Thus, the signal appearing at the output of detector 43 will contain monofrequency components attributable to variations in the difference between the characteristics of the two sea water samples represented by the spaced impedance designations at 44a and 44b. The output signal from the detector 43 is then analyzed on a frequency selective basis as by applying the same to filters 47a, 47b and 47c and/or some conventional form of display type frequency analyzer indicated at 47d. As will later become apparent in connection with the showing of FIGURE 7, frequency selective analysis of the detector output signal, provides, in accordance with the present invention, a novel and useful way of determining the age of a given portion of a wake, as well as restricting the wake analysis to those characteristics of the wake yielding the maximum information as to the nature or character of the object responsible for producing the wake. Further, under certain conditions, frequency selective analysis of the detector output signal makes it possible to determine the direction in which the object which produced the wake was travelling at the time the wake was created.

The principal remaining element in the system depicted generally in FIGURE 2 is the output device 21 which receives the differential conductivity signals from the signal generating circuits 20. A form of output device which provides a number of different indications is exemplified by the arrangement of FIGURE 6. Each of the differential conductivity signals from the different detectors is coupled back to the vehicle in which the output device is mounted. Although it will be understood that a great many detectors may be used, only four signal lines on which differential conductivity signals appear have been shown for simplicity. Each of these lines is coupled through appropriate filter circuits 45 which act in the present instance to reject low frequency, ambient fluctuation signals derived in operation of the system. Where these ambient fluctuations themselves are to be analyzed, the filters would not be used. The output signals passed from the filter circuits 45 are applied to actuate separate recording elements (not shown in detail) of a multi-channel recorder 46, so that a permanent record is maintained of the signal variations at each of the detectors.

Each of the signal lines may also be coupled to a scanner device 48 of the type which operates at a high rate of speed to continuously and successively sample the differential conductivity signals so as to identify the existence of signals representative of fluctuations other than normal ambient fluctuations. Output signals from the scanner 48 may be applied to an oscilloscope display on which variations in the differential conductivity signals may be viewed. Output signals from the scanner 48 may also be applied to a heterodyne circuit 51 for mixing the signals from the A.C. bridge circuit of FIGURE 5 with a signal of suitable frequency to provide signals of audio frequency. The audio frequency signals actuate a speaker 52 or earphones (not shown) to provide a third form of readily discernible indication of the nature of the differential conductivity signals.

A better appreciation of the operation of the system of FIGURES 1 and 2 and the more specific detailed arrangements of FIGURES 3-6 may be had from an understanding of the ambient fluctuations in the ocean microstructure, and how these ambient fluctuations are affected by the wake of a moving vehicle, such as a submarine. While all of the different variables contribute, we may initially consider how only the thermal microstructure and the salinity microstructure affect the conductivity of a given minute sample of the ocean. The fractional change of resistance of sea water due to temperature and salinity may be expressed approximately as:

$$\frac{\Delta R}{R} \cong (.02)\Delta t + .02\Delta S$$

where R is the impedance of the sea water sample, $\Delta t$ is expressed in degrees centigrade and $\Delta S$ is expressed in grams per kilogram. The ambient fluctuation field defined by the differences in physical properties between elemental units of the microstructure has continuous and slow variations. The continuity is maintained by thermal conductivity, by the slight agitations which occur, and by underwater channels and flows. Adjacent elemental units within the microstructure, therefore, have essentially like physical properties. The ambient fluctuations of the thermal microstructure and the salinity microstructure may be represented as slowly changing over long ditsances relative to the microstructure.

Ambient fluctuations with distance are illustrated in the two uppermost waveforms of FIGURE 7. The length of these ambient fluctuations may be the order of 60 centimeters, and to represent thermal fluctuations of the order of 0.05° C. The effective length of the salinity fluctuations and their variation, in parts per thousand, may be regarded as, in general, corresponding to the thermal ambient fluctuations.

In the immediate wake of a submarine, the temperature and thermal fluctuations of the microstructure vary abruptly as indicated in the second pair of waveforms of FIGURE 7, the cross-hatched portions of which denote the width of the immediate submarine wake, although not drawn to scale. On the basis of current information, it appears that the initial R.M.S. fluctuation for temperature is probably larger than 0.1° C., and for salinity fluctuations is probably larger than 0.005 part per thousand. The fluctuations in the immediate wake are therefore very much shorter and very much more abrupt than are the ambient fluctuations. They may be considered to be of the order of a few millimeters in length, so that, in the immediate wake of the submarine, definable differences exist between the physical properties of elemental unit volumes of sea water, whereas with ambient fluctuations there is a much smaller variation even over a centimeter spacing.

With the passage of time, however, the characteristics of the wake change. Current data indicate that the diffusion constant of the thermal fluctuations is approximately 0.0014 cm.$^2$ per second, while the diffusion constant for salinity fluctuations is approximately 0.00002 cm.$^2$ per second. The faster diffusion of thermal fluctuations is due, of course, to the effects of heat conduction and mechanical agitation, which act to stabilize thermal distribution in a manner which has no counterpart in the molecular activity which principally determines salinity distribution. After an intermediate interval, therefore, the thermal fluctuations in the wake of the vehicle are relatively constant because of the diffusion following mixing due to the strong turbulence. This constancy in the microstructure is not observed in the salinity fluctuations, however, in which there are wide variations which still correspond to the variations in the immediate wake of the vehicle. These fluctuations are depicted in the third pair of waveforms in FIGURE 7. At this point in time and thereafter, the differing characteristics of the microstructure are determined principally by the salinity fluctuations. As is set out in more detail below, however, the sensitivity of the detectors is sufficient to determine the passage of a vehicle due to the condition of its wake for an appreciable time thereafter.

After a still longer interval, as may be seen by the final pair of waveforms of FIGURE 7, the thermal fluctuations again begin to approach the ambient fluctuation, as do the salinity fluctuations. The thermal fluctuations, however, are increasing from essentially constant values, while the salinity fluctuations include constantly decreasing microstructural changes. Also, artifically produced turbulence may result in the absence of normal ambient temperature variations. Ultimately both regain the ambient fluctuations of the uppermost pair of waveforms of FIGURE 7.

It is, therefore, a feature of the present invention that by frequency selective analysis of an electrical signal representing differential microstructure analysis of sea water, considerable information can be derived as to the age of the wake (at the particular point of detection) and, as a consequence, data may be derived as to the general direction in which the body or object which produced the wake was travelling at the time the wake was created. Further, the relative amplitude of the disturbances constituting the wake, the uniformity with which this disturbance exists along a line transverse to the general direction of the wake, and the rate at which the amplitude of various characteristics of the wake change per unit displacement along the general direction which the wake takes—provides a useful way of determining the general character of the object responsive for producing the wake.

The frequency selective signal analyzing arrangement shown in FIGURE 5 provides means for developing such data. For example, filters 47a, 47b and 47c may be each constructed to pass respectively different bands of monofrequency signal components. Thus, filter 47a may pass signal components falling in a frequency band $f_1 \pm \Delta_f$, where $f_1$ represents a relatively low value of frequency. Filter 47b may be given a band pass characteristic $f_2 \pm \Delta_f$, where $f_2$ is a higher value of frequency than $f_1$, but lower than $f_3$ which represents the means frequency of the band pass characteristics of filter 47c. Lamps 49a, 49b and 49c each coupled to the output of a different one of the filters 47a, 47b and 47c provide means for roughly determining the age of the wake at the point it is being detected. For example, as indicated above in connection with FIGURE 7, if the wake has been recently produced, high frequency components of the detector output signal will cause lamp 49c to glow. After a longer interval, however, the lower frequency components of the detector output signal, primarily representing ambient conditions, will cause lamp 49a to glow, the brilliance of lamp 49c being then reduced. Lamp 49b being illuminated in response to signal energy falling in a band of frequencies intermediate the pass bands of filters 47a and 47c will, of course, glow more brightly during the detection of recently produced wakes and less brightly during the detection of wakes having substantial age. A more detailed analysis of the output signal from detector 43 may, of course, be obtained through the use of a visual display type frequency analyzer such as that indicated at 47d. By comparing the distribution of monofrequency components comprising the detector output signal at a time $T_1$ with a like analysis of the detector output signal at a later time $T_2$, the general direction which the object which produced the wake was travelling at the time it produced the wake may be determined.

In detecting conductivity differentials in the ocean microstructure, therefore, the detectors 14 and the signal generating circuits 20 (FIGS. 1 to 5) operate in response to the aggregate of the fluctuations of the physical properties, including temperature and salinity, of the microstructure. The two narrow, closely spaced zones at different depth regions are continuously sampled by using the associated sea water as resistive elements. Where the resistivity of the two samples varies only in accordance with ambient fluctuations, the spaced resistive samples are essentially in balance. Thus, the magnitude of the differential conductivity signal is small because the bridge circuit (FIGURE 5) remains balanced. Where turbulent mixing has occurred, however, the resistivity samples presented between the electrodes 25, 26 and 29 of the upper pair (FIGURE 3) and the electrodes 25, 27 and 30 of the lower pair vary abruptly. An amplitude modulation is applied to the carrier provided by the balanced bridge circuit by these fluctuations, and high amplitude oscillatory waveforms are provided by the signal generating circuits 20. The rate of movement of the vehicle 10 is selected, with respect to the spacing and size of the sampled zones, such that distinguishable differences exist between the signals generated in response to ambient fluctuations and those fluctuations due to artificial turbulence. It is further noted that by increasing the power delivered by the oscillator to the seat water samples, as by adjustment of the power control means 24′, the samples of sea water may be heated to a substantial extent. The balance of the bridge will then depend upon the heat capacity of the sea water samples—thus, in effect, sensing a different property of the sea water.

The value of sensing the aggregate difference in conductivity due to all the different properties which contribute will be more fully appreciated when the nature of the different properties is considered. In the wake of a cavitating body, such as a submarine, a marked initial effect may arise from air bubbles. Also, velocity fluctuations may exist for some time, causing differences in ion transfer and thus conductivity. While these may diffuse and disappear relatively rapidly, the remaining fluctuations still exist and may be thought of as frozen or static for the period of analysis. Although the natures of the fluctuations differ widely, they all contribute to the identification of artificially created turbulence.

In a specific arrangement of a detector of the form of FIGURES 3 and 4 and a signal generating circuit 20 of the type illustrated specifically in FIGURE 5, a gap of one centimeter between the upper and lower paired electrodes was employed, together with an oscillator 34 frequency of 10.3 kc. and an amplifier 41 gain of 117,000. The spacing of the electrodes of the pair was such that the resistance of the sea water was approximately 60 ohms. It was found that with a refined balance in the A.C. bridge (3 microvolts output for 0.8 volt input) the sensitivity which was attained was a significant fraction of the theoretical ultimate sensitivity expected.

It is a feature of the present invention that in a preferred embodiment thereof, the two gaps of the differential detectors shown in FIGURE 4 are each placed on a different one of those surfaces forming the wedge or axe-like structure illustrated. It has been found that with such an arrangement, the sea water samples upon which the detector gaps operate are in character substantially the same as though the gaps themselves were placed in the free stream of the wake. This is thought to be attributable to the laminar flow characteristics of the wedge when the relatively sharp front portion thereof, 25, is pointed in the direction of its motion.

In operation, the arrangement of FIGURE 5 provides a low level amplitude modulated A.C. output signal of slowly varying characteristics when the conductivity samples being tested vary only in accordance with the ambient fluctuations. When the wake of a submarine is encountered, however, an oscillatory waveform of appreciable amplitude deviation appears during the interval in which the wake is being traversed. The amplitude modulated oscillatory waveform actuates the associated output devices to provide a recorded pattern, a temporary display, or an audible signal. The arrangements of FIGURES 3 and 4 have particular advantages because they deal directly in impedance values and minimize noise factors so as to achieve greatest sensitivity. They are extremely simple and compact, and virtually free of maintenance problems.

Certain relationships may be observed if it is desired to obtain maximum useful output. The gap between the paired electrodes (1 cm. in the example given) is sufficiently small for microstructure sampling wherever the two electrode pairs of a detector are placed. It is preferred, however, to use a spacing between the two electrode pairs which is approximately the same as the gap spacing. This facilitates microstructure analysis, because a large scale constant differential between the volumes samples is eliminated. Where the samples are taken far apart, there may be a major temperature difference, for example, which would obscure to some extent the abrupt conductivity fluctuations used for wake detection. Also, it should be recognized that the spatial length of the fluctuations (what might be called the fluctuation wavelength), the speed of movement of the detectors and the effective sensing area common to the two detectors determine the highest frequency at which the carrier delivered by the bridge circuit is modulated. Thus, in accordance with the present invention, the parameters of the overall detector and signal generating circuit should be chosen so as to yield a differential signal having monofrequency components whose frequency value $f$ is not substantially less than $$f = \frac{V}{L}$$

where V is relative velocity between the detector and sea water and L is effective length of the detector gap taken along a line coincident with the direction of relative motion, expressed in the same length units.

The suitability of systems in accordance with the invention for tracking in a manner which is complementary to existing underwater detection devices is thus evident. A submarine at great depth and engaged in evasive maneuvers to confuse or counteract sonar leaves a wake which may most readily be detected and followed by the systems here described. The greater the speed of the submarine, the longer is the distance at which its presence may be apprehended. The life of the wake of the submarine is not diminished, and may even be increased because of the greater submarine speed and attendant turbulence of the wake. Thus, the system automatically has longer range when used to detect high speed submarines.

In order for a vehicle employing a differential detection system to cover a large volume of water, the detectors should be spaced at intervals sufficient to intercept the width of a wake (say 50 to 200 feet) and to the maximum depth range of the underwater object. Then one or more of the vehicles may follow a predetermined areal pattern so as to sweep out a volume in searching for the object within the volume. The pattern may be performed in such manner as to intercept, within a predetermined maximum time, the wake of any large underwater object moving within the volume. Once a wake is intercepted, the characteristics of the wake itself identify the age of the wake at that time. If it is desired to follow the wake, a pattern may be executed to again intercept the path once more so that it may be defined in three dimensions and in direction. Thereafter the object may be followed directly by moving the detectors along the center or a border region of the wake. The value of the information is material because a given tracking vehicle should know whether it has the range to intercept the object being tracked. In addition, the position of the object may be predicted, and in some instances its type may be identified.

It will be recognized that this system is entirely passive and that it may be counteracted only by measures which lead to greater susceptibility to sonar or radar detection. Furthermore, the use of an analysis of the ocean microstructure as a basis for identifying the wake of an underwater object is directly applicable to a number of other uses for the same purpose. Just as a surface vehicle trailing a detector cable may follow a wake by keeping the detected signal in a given range, so an automatic control torpedo using conventional homing circuits may be employed to track a moving submarine in response to signals from a differential conductivity detector.

In addition, it should also be recognized that only a relative movement between water and the detectors is needed for identification of the wake of an underwater vehicle or object. Thus, as shown in FIGURE 8, the cable is suspended in a current with the bottom portion of a detector cable anchored, and the surface end of the cable coupled to a floating buoy containing signal generating circuits of the type previously described, in addition to a transmitting system and antenna. With this arrangement, ocean currents effectively move the wakes of underwater objects past the detector, so that a group of such detection devices spaced at different points along a predetermined line provide an effective detection barrier along the line.

In some instances the use of exposed electrodes, even if embedded, may not permit indefinite longevity, as where the surface may become eroded or covered by sediment or marine life. It is additionally within the concept of the invention, however, to utilize impedance differentials between microstructure sample zones where the differentials are sensed by other means. Thus, as in FIGURE 9, the unknown arms of a bridge circuit (similar to that previously described) may be provided by transformer elements 60, 61. Each of the transformer elements 60, 61 is imbedded beneath the surface of a nonconductive streamlined housing 15. The elements 60, 61 are in the form of loops, just below the surface, and are excited by an A.C. source 63 so that the magnetic field lines of the two transformer elements 60, 61 extend in a symmetrical fashion through the adjacent water samples. As before, the samples consist of small zones, spaced apart a selected distance. The two transformer elements 60, 61 are coupled to signal generating circuits 21 which provide the differential signal to the output device (not shown in FIGURE 9).

In this arrangement, the impedances presented by the two different water samples control the differential reading. The conductivity of the samples affects the coupling of the induced currents in the water, thus in turn controlling the loading of the transformer elements 60, 61 so as to unbalance the bridge correspondingly. Consequently, differential readings are taken which are dependent upon the impedance values of the two samples, even though all of the active elements are imbedded.

An example of the use of devices and systems in accordance with the invention for oceanographic purposes is provided in FIGURE 10. As there shown, a vehicle 10 may trail an attached cable 11, to the free end of which is coupled a turbulence generator 70 which may also serve as a weight. Within the wake of the turbulence generator 70, there are maintained at least two detectors, here including a leading detector 72 and a trailing detector 73. This arrangement takes advantage of the different diffusion or stabilizing times of the different variables to provide information about the actual fluctuations of each of the variables. The signals from the two detectors 72, 73 are coupled back to the vehicle 10, and applied to converter circuits 75, such as analog computing devices operating in accordance with the known diffusion constants of the variables, the speed of the vehicle 10, and the spacing of the detectors 72, 73. By thus operating with known turbulence conditions, the converter circuits 75 may derive ΔT and ΔS, for example, which represent the actual contributions of each of the temperature and salinity fluctuations. By this means and by the use of the ambient fluctuations alone, as described above, water samples may be characterized or "fingerprinted" so that oceanographic studies may be carried out in great detail. For such studies, the spacing between the detectors may be somewhat greater than that used for wake detection.

Alternatively, differential readings of other kinds may be used to derive the desired information about the physical properties of the ocean microstructure. For example, the opacity of microstructure samples varies with air bubble and impurity fluctuations. The velocity of sound waves, on the other hand, differs measurably with the temperature of ocean waters thorugh which the waves are passed. Whatever the differential detection principle employed, analysis of microstructure in accordance with the present invention is utilized to detect the passage and path of objects far larger than the microstructure itself.

One such system, utilizing opacity or light transmissivity, is shown in FIGURE 11. This system is particularly suited for wake detection in the regions near the ocean floor, where sediment is stirred up by the movement of an object, and where the character of the wake introduces bubbles or particles. As above, a streamlined housing 15 is used on a cable 11. In the leading edge of the housing 15, however, the operative elements are included within protruding fingers of tapered shape. A light source 80, activated by a current source 81, is imbedded within a central one 82 of the fingers. The light from the source 81 is directed through translucent windows and the two different water samples toward individual photoconductive elements 85, 86 which are positioned behind other translucent windows in the top and bottom fingers 87, 88 of the structure. Again, the relative attitudes of the fingers are not of importance to the microstructure analysis.

In this arrangement also, high sensitivity is obtained through use of the light transmissivity fluctuations of the two samples to control the conductivity of the photoconductive elements 85, 86, and thus the balance of the signal generating circuits. While the physical property, opacity, is under investigation, it will be recognized that higher noise levels are inherent in this arrangement.

The compressibility or sound propagation characteristics of two water samples may also be used for differential analysis, as shown in FIGURE 12. For this purpose, there are employed two velocimeters, which are known devices of very small size. Each employs a sound pulse transmitter 90, 91 actuated by a controllable pulse generator 92, 93. A different receiver 94 or 95, separated by one of the microstructure samples, is spaced apart from each of the transmitters 90, 91. Each receiver 94 or 95 provides signals through an amplifier 98 or 99 to the associated pulse generator 92 or 93. The amplified pulses control the time of generation of a pulse by the generator, so that in effect recirculating delay lines are created, having periodicities determined by the compressibility of the two samples.

While there have been described above various arrangements and methods for detecting underwater vehicles or objects by analysis of the ocean microstructure, it will be appreciated that various modifications and alternative forms are also possible. Accordingly, this invention should not be considered to be limited to the arrangements which have been depicted, but should be taken to include all systems, devices, and methods falling within the scope of the appended claims.

I claim:

1. A system for detecting wakes of submerged moving objects in the ocean including the combination of a support line extending through a given region, means for moving the line, and a number of detectors at spaced locations along the line, each of the detectors including means for measuring the difference in the electrical impedance of water simultaneously at two different regions thereof that are spaced apart by a distance smaller than the spacing between said detectors.

2. A system for detecting wakes of submerged moving objects in the ocean, including a number of relatively widely spaced detectors physically coupled to move through different spaced regions in the ocean, each of the detectors including means making simultaneous measurements of the electrical impedance of water at two regions thereof that are spaced apart by a distance smaller that the spacing between said detectors, and means for detecting the difference between said impedance measurments.

3. An underwater moving object detector system comprising a vehicle movable relative to the water, an extended line maintained within the water and extending angularly outwardly from the direction of vehicle movement, and means for sensing the wake of a moving object in the water, including a number of differential conductivity detectors spaced along the extended line, each of said detectors including means for measuring the difference in the electrical impedance of water simultaneously at two different regions thereof that are spaced apart by a distance smaller than the spacing between said detectors.

4. A system for detecting artificially created ocean disturbances occurring in localized zones including in combination an extended connecting element having a relative movement with respect to the water, a plurality of detecting means spaced along the connecting element to move through different regions, each of the detecting means including means for measuring the difference in the electrical impedance of water simultaneously at two different regions thereof that are spaced apart by a distance smaller than the spacing between said detecting means, and means coupled to each of the detecting means for indicating fluctuations in the microstructure of the water which are more abrupt than the ambient fluctuations.

5. The invention according to claim 4, wherein said impedance difference measuring means includes a pair of spaced electrodes at a location corresponding to each of said different regions for measuring the conductivity of the water between the electrodes.

6. Apparatus for distinguishing the wake of an underwater object comprising means for sensing differences in physical properties between closely spaced zones in the water and including means for measuring the difference in the electrical impedance of water simultaneously at two different regions thereof, means for moving the difference sensing means through the water, the relationship between the spacing and the rate of movement being such that the sensed differences in electrical impedance which are caused by turbulent mixing in the wake of an underwater object are appreciable by comparison to ambient fluctuations, and means coupled to the difference sensing means for distinguishing differences in electrical impedance in the water caused by the wake of an underwater object.

7. A system for passively detecting the presence of a submarine by its wake, comprising a number of conductivity difference sensing means spaced in different regions in the water, each of the conductivity difference sensing means simultaneously sensing the aggregate variation in conductivity due to temperature and salinity variations between relatively closely spaced and narrow zones in the water, normally balanced bridge means coupled to the conductivity difference sensing means to employ the conductivity difference sensing means as unknown resistive elements, means for moving the conductivity difference sensing means through the water at a selected rate, such that the differences in conductivity due to ambient fluctuations cause relatively slowly changing unbalance of the bridge means, while the relatively shorter length fluctuations in the turbulently mixed wake of a submarine cause appreciable and faster changing unbalance, and means coupled to the balanced bridge means for distinguishing passage of a conductivity difference sensing means through a region previously disturbed by the wake of a submarine.

8. A system for detecting artificially created disturbances at appreciable depths in ocean waters including the combination of a support line movable with respect to the water and extending at an angle from the direction of relative movement between the support line and the water, a number of differential conductivity detectors, each mounted at a different position along the length of the support line and each including at least two pairs of spatially separated electrodes exposed to the water, there being an identical spacing between the electrodes of each pair, the detectors also including normally balanced bridge means coupled to the pairs of electrodes, with the water samples between the electrodes of each pair constituting unknown adjacent resistive elements in the bridge, and output signal utilization circuits coupled to the detectors for deriving signals representative of departures in the conductivity distribution from ambient fluctuations.

9. An underwater moving object detector system including the combination of a seagoing craft, an extended line attached to the craft and maintained angularly outwardly from the direction of movement of the craft in the water, a number of detectors spaced along the extended line, each of the detectors including means for measuring the difference in the electrical conductivity of water simultaneously at two different regions thereof that are spaced apart by a distance smaller than the spacing between said detectors, and means coupled to the detectors for utilizing signals from the detectors to indicate the presence of a wake due to fluctuations at a detector which are of shorter length than the ambient fluctuations of the physical properties in adjacent regions in the water.

10. A system for detecting submarine wakes in ocean waters including the combination of a vehicle movable in the ocean, a support line attached at one end to the vehicle and extending through the water away from the vehicle, a planing element coupled to the opposite end of the support line from the vehicle to maintain the support line extended at an appreciable angle with respect to the direction of movement of the vehicle in the water, a number of differential conductivity detectors, each positioned at a different location along the length of the support line, and each including a streamlined housing, at least two pairs of electrodes exposed to the water through the housing, the electrodes of each pair having substantially identical spacings from each other and the pairs being positioned apart to pass through closely adjacent zones in the water, each detector also including an A.-C. bridge circuit coupled to the pairs of electrodes and including the water samples between the electrodes of each pair as adjacent resistive elements in the bridge, circuit connections positioned along the support line and coupling each of the detectors to the vehicle, and the system also including means coupled to the circuit connections and positioned within the vehicle for utilizing the signals from the detectors to distinguish passage of the detectors through the artificially mixed wake of a submarine.

11. The method of detecting the presence and direction of movement of a submarine which includes the steps of continually sensing conductivity differentials between relatively narrow closely adjacent zones at relatively widely spaced regions along a line to determine aggregate fluctuation differentials for physical properties including temperature and salinity, while moving in an interception pattern so as to sweep out a volume within which a submarine is to be detected, the spacing of the zones and the movement being at a rate which is selected relative to the length of ambient flucutations to provide relatively little conductivity differential except when passing through the relatively sharter length fluctuations caused by turbulent mixing in the wake of a submarine, and moving in an interception path to again cross a detected submarine wake to determine the direction of the submarine by the difference between the nature of the fluctuations at successive crossings of the wake.

References Cited by the Examiner
UNITED STATES PATENTS

| | | | |
|---|---|---|---|
| 2,248,982 | 7/41 | Gillbergh | 324—2 |
| 2,366,694 | 1/45 | Bender | 324—2 X |
| 2,531,088 | 11/50 | Thompson | 324—1 |
| 2,552,017 | 5/51 | Schwartz et al. | 324—65 X |
| 2,577,612 | 12/51 | Fay | 304—61 |
| 2,616,950 | 11/52 | Terpstra | 324—65 |
| 2,691,422 | 10/54 | Summers et al. | 324—1 X |
| 2,750,794 | 6/56 | Downs. | |
| 2,756,404 | 7/56 | Anderson et al. | 73—53 X |
| 2,770,795 | 11/56 | Petterson | 340—3 |
| 2,779,931 | 1/57 | Hersey | 340—3 |
| 2,794,974 | 6/57 | Bagno et al. | |
| 2,798,211 | 7/57 | Smith | 340—7 X |
| 2,838,741 | 6/58 | Mason | 340—6 X |
| 2,935,874 | 5/60 | Morgan | 324—34 X |
| 2,963,642 | 12/60 | Arbogast et al. | 324—13 |
| 3,005,974 | 10/61 | Northrup | 340—4 |
| 3,017,607 | 1/62 | Rubens et al. | 340—4 X |
| 3,020,470 | 2/52 | Shawhan et al. | 324—3 |

WALTER L. CARLSON, *Primary Examiner.*

LLOYD McCOLLUM, *Examiner.*